(12) United States Patent
Chang et al.

(10) Patent No.: US 9,686,105 B2
(45) Date of Patent: Jun. 20, 2017

(54) CLOCK AND DATA RECOVERY CIRCUIT AND FREQUENCY DETECTION METHOD THEREOF

(71) Applicant: REALTEK SEMICONDUCTOR CORP., Hsinchu (TW)

(72) Inventors: Feng-Cheng Chang, Nantou County (TW); Xiao-Guo Zheng, Jiangsu (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 14/993,713

(22) Filed: Jan. 12, 2016

(65) Prior Publication Data

US 2016/0211964 A1 Jul. 21, 2016

(30) Foreign Application Priority Data

Jan. 20, 2015 (CN) .......................... 2015 1 0027421

(51) Int. Cl.
*H03D 3/24* (2006.01)
*H04L 25/49* (2006.01)
*H04L 7/033* (2006.01)

(52) U.S. Cl.
CPC ............ *H04L 25/49* (2013.01); *H04L 7/0331* (2013.01)

(58) Field of Classification Search
None
See application file for complete search history.

(56) References Cited

U.S. PATENT DOCUMENTS

| 6,158,014 A | 12/2000 | Henson |
| 6,680,970 B1 * | 1/2004 | Mejia ........................ H03L 7/06 375/225 |
| 7,093,151 B1 | 8/2006 | Williams |
| 2003/0223520 A1 * | 12/2003 | Kennedy ................. H03L 7/099 375/354 |
| 2007/0064837 A1 * | 3/2007 | Meltzer ................... H03L 7/087 375/327 |
| 2011/0169535 A1 * | 7/2011 | Kyles ........................ H03L 7/07 327/156 |
| 2012/0109356 A1 | 5/2012 | Kong et al. |

FOREIGN PATENT DOCUMENTS

TW 200501583 A 1/2005

* cited by examiner

*Primary Examiner* — Shuwang Liu
*Assistant Examiner* — Gina McKie
(74) *Attorney, Agent, or Firm* — Li & Cai Intellectual Property (USA) Office

(57) ABSTRACT

The present disclosure provides a crystal-less clock and data recovery (CDR) circuit and a frequency detection method thereof. The CDR circuit includes a clock generator and a frequency detection module. The clock generator is operable to generate a clock signal. The frequency detection module coupled to the clock generator is configured for outputting a control signal to the clock generator to increase or decrease the frequency of the clock signal according to a data signal received and a transition density.

14 Claims, 10 Drawing Sheets

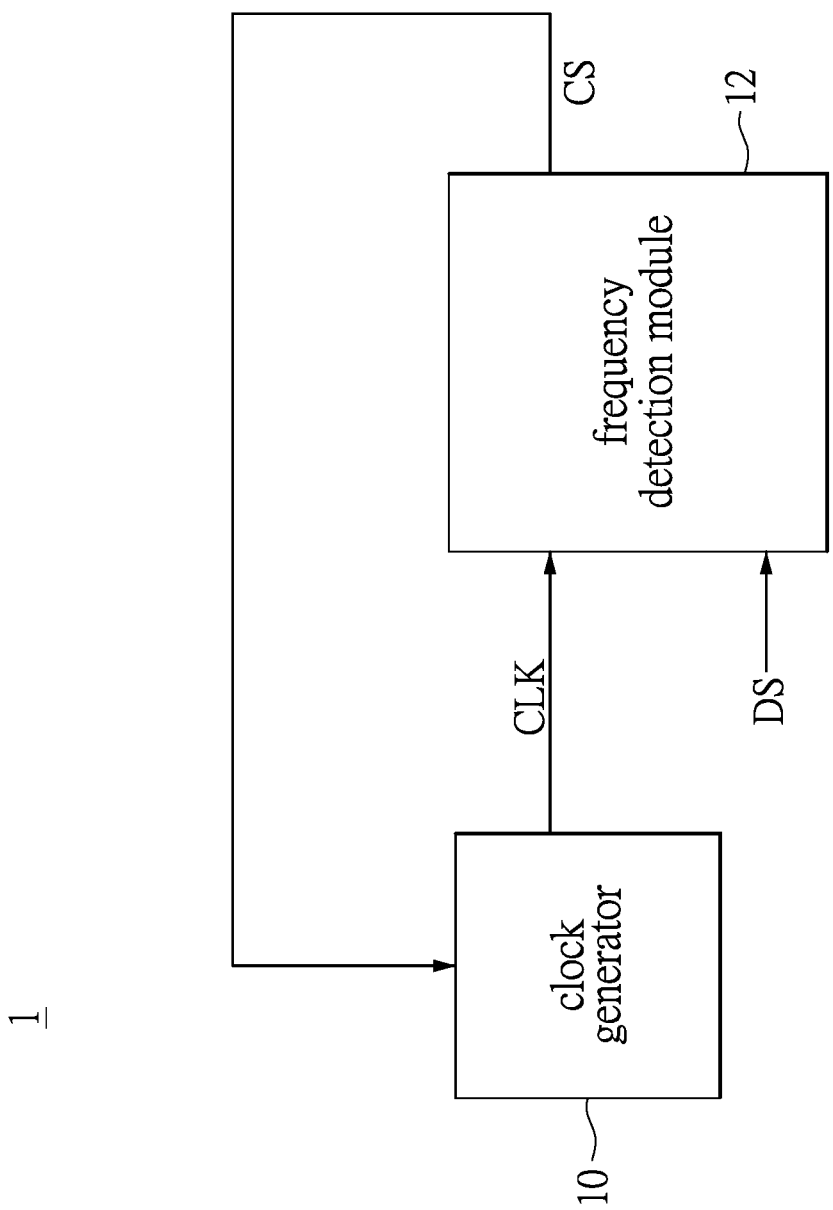

CLOCK AND DATA RECOVERY CIRCUIT AND FREQUENCY DETECTION METHOD THEREOF

BACKGROUND

1. Technical Field

The present disclosure relates to a detection method in particular, to a frequency detection method used for a clock and data recovery (CDR) circuit operating without referencing an external reference clock signal.

2. Description of Related Art

In a general communication system, a transmitter operatively generates a data signal according to the clock signal at the transmitter and transmits the data signal to a receiver through a wireless or wired transmission medium. In order for the receiver to correctly identify the logic level (e.g., 0 or 1) of the data signal, the receiver has to read the data signal received after the clock signal at the receiver had synchronized with the clock signal at the transmitter. Conventionally, the receiver includes a clock and data recovery (CDR) circuit for recovering the clock signal at the receiver to be identical to the clock signal at the transmitter.

Generally, at least one clock generator is built-in the CDR circuit for generating a sampling clock signal having a specific frequency. The CDR circuit must ensure that the sampling signal can effective sample the data signal. Specifically, during the operation, the CDR circuit adjusts the frequency of an initial clock signal of the clock generator to the specific frequency before beginning to sample the data signal received. For example, when the frequency of an initial clock signal is too low, causing distortion in the sampling result, the CDR circuit generates a control signal to drive the clock generator to increase the frequency of the clock signal.

However, the clock generator, being built-in the CDR circuit, is known to be vulnerable to variations in semiconductor processing, temperature, and voltage generating the problem of frequency drifting. Accordingly, most of the conventional CDR circuits adjust an initial clock signal of the built-in clock generator according to a reliable and precise external reference clock signal. For example, the reference clock signal may be a clock signal transmitted to the receiver by the transmitter during data transmission or may be generated externally by a reliable off-chip crystal oscillator connected thereto.

SUMMARY

An exemplary embodiment of the present disclosure provides a crystal-less clock and data recovery (CDR) circuit including a clock generator and a frequency detection module. The clock generator operatively generates a clock signal. The frequency detection module is coupled to the clock generator. The frequency detection module operatively generates and outputs a control signal to the clock generator according to a data signal received and a transition density, so as to increase or decrease the frequency of the clock signal generated by the clock generator.

An exemplary embodiment of the present disclosure provides a crystal-less CDR circuit including a frequency detection module and a clock generator. The frequency detection module is configured for generating a frequency computation value according to a data signal received and a transition density. The clock generator is coupled to the frequency detection module. The clock generator is configured to correspondingly generate a clock signal according to the frequency computation value received. The frequency of the clock signal is the same as the frequency of the data signal.

An exemplary embodiment of the present disclosure provides a frequency detection method for a crystal-less CDR circuit, wherein the crystal-less CDR circuit includes a clock generator and a frequency detection module. The frequency detection method includes the following steps. The clock generator is first driven to generate a clock signal. The frequency detection module is driven to output a control signal thereafter to the clock generator according to a data signal received and a transition density, so as to increase or decrease the frequency of the clock signal generated by the clock generator.

An exemplary embodiment of the present disclosure provides a frequency detection method for a crystal-less CDR circuit, wherein the crystal-less CDR circuit includes a frequency detection module and a clock generator. The frequency detection method includes the following steps. The frequency detection module is driven to generate a frequency computation value according to a data signal received and a transition density. Then, the clock generator is driven to generate a clock signal according to the frequency computation value received, wherein the frequency of the clock signal is the same as the frequency of the data signal.

To sum up, the crystal-less CDR circuit and the frequency detection method provided by the present disclosure is capable of accurately detecting the clock frequency of the data signal received and directly calibrating the clock signal generated by the built-in clock generator, accordingly, without referencing an external-supplied reference clock signal to adjust the clock signal generated by the built-in clock generator. Accordingly, the cost for design the overall system architecture can be lowered.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 1 is a block diagram of a clock and data recovery circuit provided in accordance with an exemplary embodiment of the present disclosure.

DESCRIPTION OF THE EXEMPLARY EMBODIMENTS

Figure 2A:
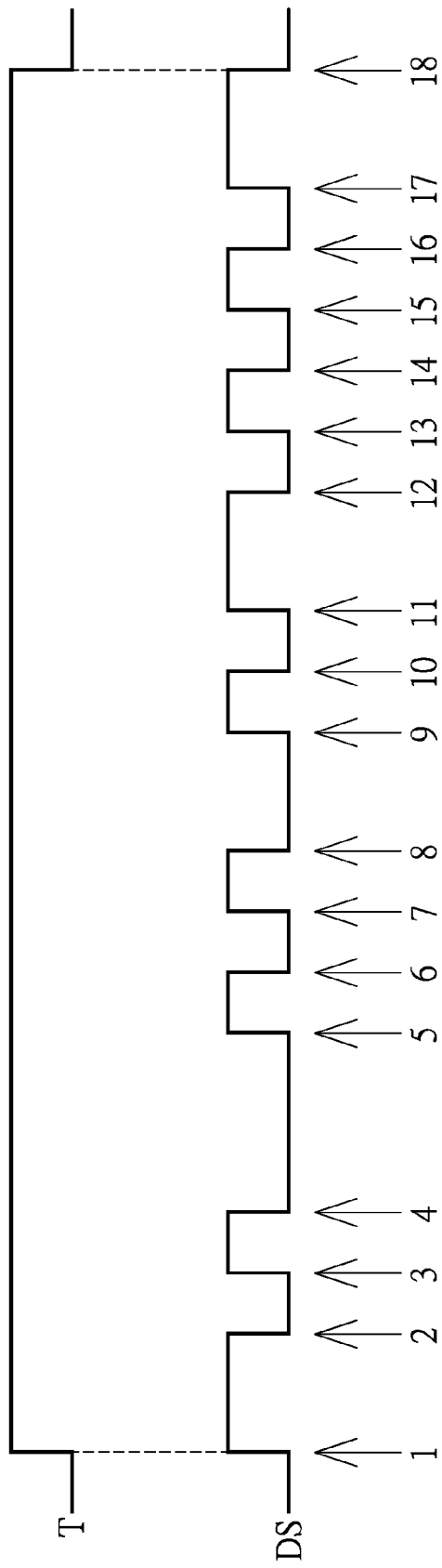
FIG. 2A is a timing diagram showing the clock edges of a data signal provided in accordance with an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Please refer to FIG. 1, which shows a block diagram illustrating a clock and data recovery circuit provided in accordance with an exemplary embodiment of the present disclosure. The clock and data recovery (CDR) circuit 1 includes a clock generator 10 and a frequency detection module 12. The frequency detection module 12 is coupled to the clock generator 10. The above described components can be integrated or separately disposed and the instant disclosure is not limited thereto.

The clock generator 10 is configured to operatively generate a clock signal CLK. The frequency detection module 12 is configured to generate a control signal CS according to a transition density TD and a data signal DS received. The frequency detection module 12 further outputs the control signal CS to the clock generator 10 to increase or decrease the frequency of the clock signal CS generated, accordingly. In other words, the clock generator 10 increases or decreases the frequency of the clock signal generated responsive to the control signal CS.

To put it concretely, the clock generator 10 herein represents the internal frequency source commonly used in chips. It is well-known that the internal frequency source of a chip can be easily affected by factors including but not limited to the semiconductor processing variations, temperature variations, and voltage variations, and generating the frequency drifting problem. Therefore, the clock signal generated by the internal frequency source of the chip is not as reliable and accurate as the reference clock signal generated by an external crystal oscillator. As a result, most of the conventional CDR circuits resolve the frequency drifting problem by relying on an external reference clock signal to calibrate the internal frequency source of the chip.

The main idea of the CDR circuit 1 of the present disclosure is to operate without using any external reference signal. In other words, CDR circuit 1 of the present disclosure is a crystal-less CDR circuit. Particularly, the clock generator 10, without receiving any external reference signals, can directly adjust the clock signal CLK generated according to the number of edges detected for the data signal DS received. The CDR circuit 1 can effectively calibrate the clock signal CLK and ensure that the CDR circuit 1 operates normally.

Based on the above elaborations, those skilled in the art should understand that the CDR circuit 1 calibrates the internally generated clock signal CLK to ensure that the receiver can accurately recover the clock signal at the transmitter, however the present disclosure does not limit whether or not the receiver uses the clock signal recovered to sample the data signal received. For instance, the clock signal CLK adjusted may be finely adjusted according to the application or operational needs before being used to sample the data signal DS. However the present disclosure is not limited thereto.

More specifically, the frequency detection module 12 of the present disclosure determines whether the clock signal CLK currently generated by the clock generator 10 is appropriated according to the relation between the clock edges of the data signal DS received and a transition density and/or causes the clock generator 10 to self-adjust and generate the clock signal CLK having frequency complying with the frequency of data signal DS. For instance, when the frequency detection module 12 determines that the frequency of the clock signal CLK generated is too low and would cause distortions in the sampling process of the data signal DS, the frequency detection module 12 operatively outputs the control signal CS to the clock generator 10 and causes the clock generator 10 to increase the frequency of the clock signal CLK, accordingly.

Please refer to FIG. 2A, which shows a timing diagram illustrating the clock edges of a data signal provided in accordance with an exemplary embodiment of the present disclosure. The frequency detection module 12 computes the number of clock edges associated with the data signal DS according to the number of rising edges and the number of falling edges of the data signal DS detected. Taking FIG. 2A as an example, the frequency detection module 12 counts the total number of rising and falling edges of the data signal DS occurred in a unit time interval T to be 18, i.e., the number of the clock edges detected for the data signal DS received in the unit time interval T is 18. It is worth noting that the present disclosure does not limit the exact method for computing the number of clock edges to counting the number of rising and falling edges. The frequency detection module 12 may in one embodiment compute the number of clock edges according to only the number of rising edges or only the number of falling edges detected. Thus, the present disclosure is not limited thereto.

Figure 2B:
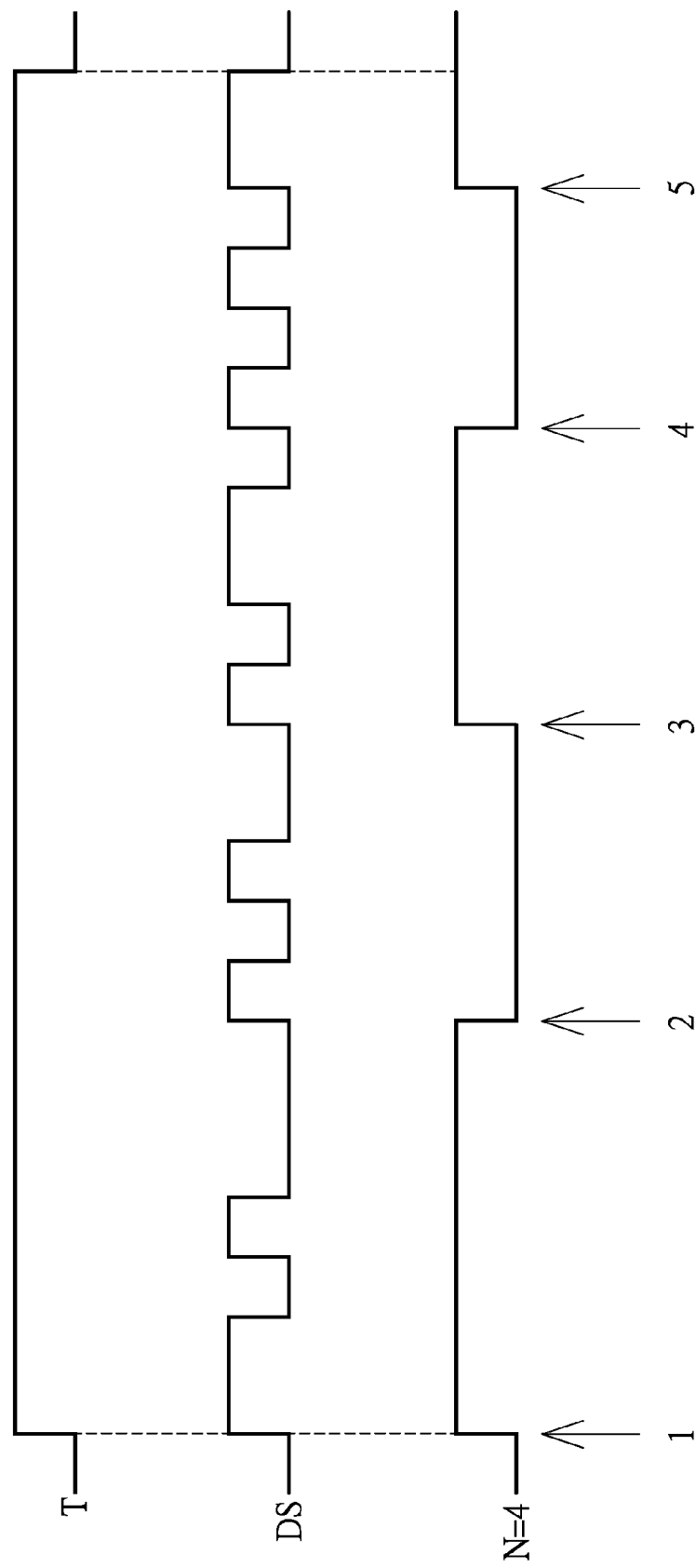
FIG. 2B is a timing diagram showing the clock edges of a standard clock signal provided in accordance with another exemplary embodiment of the present disclosure.

Additionally, those skilled in the art should be able to generalize other implementations for the frequency detection module 12 to detect and compute the clock edges of the data signal DS based on the above elaborations. Please refer to FIG. 2B, which shows a timing diagram showing the clock edges of a standard clock signal provided in accordance with another exemplary embodiment of the present disclosure. The frequency detection module 12 may for instance, process the number of clock edges of the data signal DS detected further with a divider. Taking FIG. 2B for example, the frequency detection module 12 may compute that the total number of rising and falling edges in the unit time interval T to be 18, but the frequency detection module 12 may adjust the number of clock edges to 5 by processing the computation result with a divider (e.g., N=4). In short, the instant disclosure does not limit the exact implementation method for determining the number of clock edges, and those skilled in the art may design the exact implementation method based on the practical or application needs.

Figure 2C:
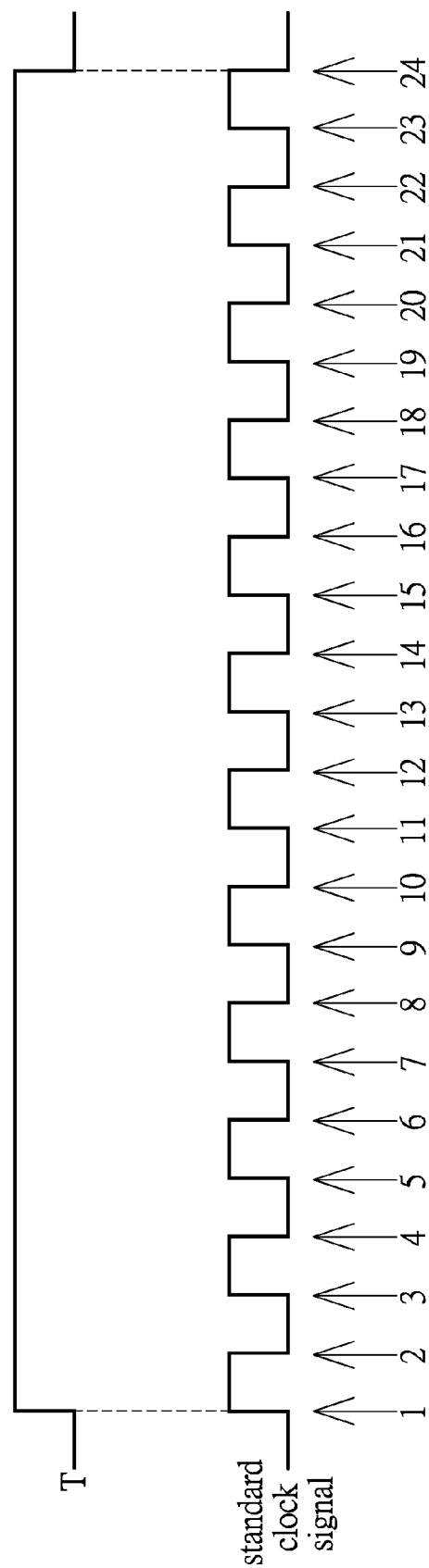
FIG. 2C is a timing diagram showing the clock edges of a data signal provided in accordance with an exemplary embodiment of the present disclosure.

The transition density TD of the instant embodiment is the ratio between the number of clock edges associated with the data signal and the number of clock edges associated with a standard clock signal detected within the unit time interval T. Please refer to FIG. 2C in conjunction with FIG. 2A for an illustrative example. FIG. 2C shows a timing diagram illustrating the clock edges of a data signal provided in accordance with an exemplary embodiment of the present disclosure. If the number of clock edges of a standard clock signal is 24, then the transition density TD of the data signal received will be 18/24=0.75. It is worth to note that the present disclosure is not limited to the exact implementation of the standard reference clock signal and those skilled in the art may design the standard reference clock signal based on the practical or application needs.

Additionally, there exists an encoding technique for the encoding method of a high speed digital data transmission. The following embodiments will be described using the 8B10B encoding scheme and in accordance with the DisplayPort standard. The most number of equal bits (e.g., consecutive positive or negative logic levels) can at most be five for a data signal encoded with 8B10B. Therefore, it can be computed that after the physical layer of the DisplayPort uses 8B10B encoding, the transition density of the data signal would be found lying between 0.594 and 0.606, i.e., 0.6+/−1%. Hence, it can be noted from above that for the data signal encoded with 8B10B encoding, the transition density thereof can only vary within the range described above.

Accordingly, when the receiver receives the data signal DS transmitted from the transmitter while knowing that the transition density TD of the data signal DS shall maintain below 0.6+/−1%, the receiving end can deduce the frequency magnitude of the clock signal CLK. In particular, the CDR circuit 1 at the receiving end must control the clock generator 10 to generate the clock signal CLK in such a way that the ratio between the number of clock edges associated with the clock signal CLK and the clock edges associated with the data signal DS complies with the requirement of the transition density TD of lying between 0.6+/−1%.

Briefly, the main technological concept of the present disclosure is that the CDR circuit 1 not only is capable of receiving the data signal DS, but also has the information of the transition density TD of the data signal, wherein the transition density TD herein represents the ratio between the number of clock edges associated with the data signal DS and the number of clock edges associated with a standard clock signal detected within a unit time interval T. Accordingly, the CDR circuit 1 of the present disclosure by knowing the two out of three parameters (e.g., the clock edges of data signal DS and the transition density TD) can easily deduce the third parameter (the clock edges of the standard clock signal). Specifically, the CDR circuit 1 can effectively control the clock generator 10 to generate the clock signal CLK close to the standard clock signal so that the CDR circuit 1 can operate normally with the clock signal CLK.

It is worth to note that the transition density TD of the data signal DS in the instant embodiment is maintained at 0.6+/−1% as a result of the data signal DS being encoded using the 8B10B encoding scheme and in accordance with the DisplayPort Standard. However, the present disclosure is not limited to using the 8B10B encoding scheme or to following the DisplayPort Standard, and the transition density TD may vary according to different encoding schemes or forms of the standard clock signal. Therefore, those skilled in the art should be able to design transition density TD based on practical needs. The CDR circuit 1 of the instant disclosure is operable to generate an appropriate clock signal CLK with prior knowledge of a proper transition density TD that corresponds to the transmission standard, and calibrate the clock signal CLK generated by the built-in clock generator 10 in such a manner that the CDR circuit 1 can operate normally.

Figure 3:
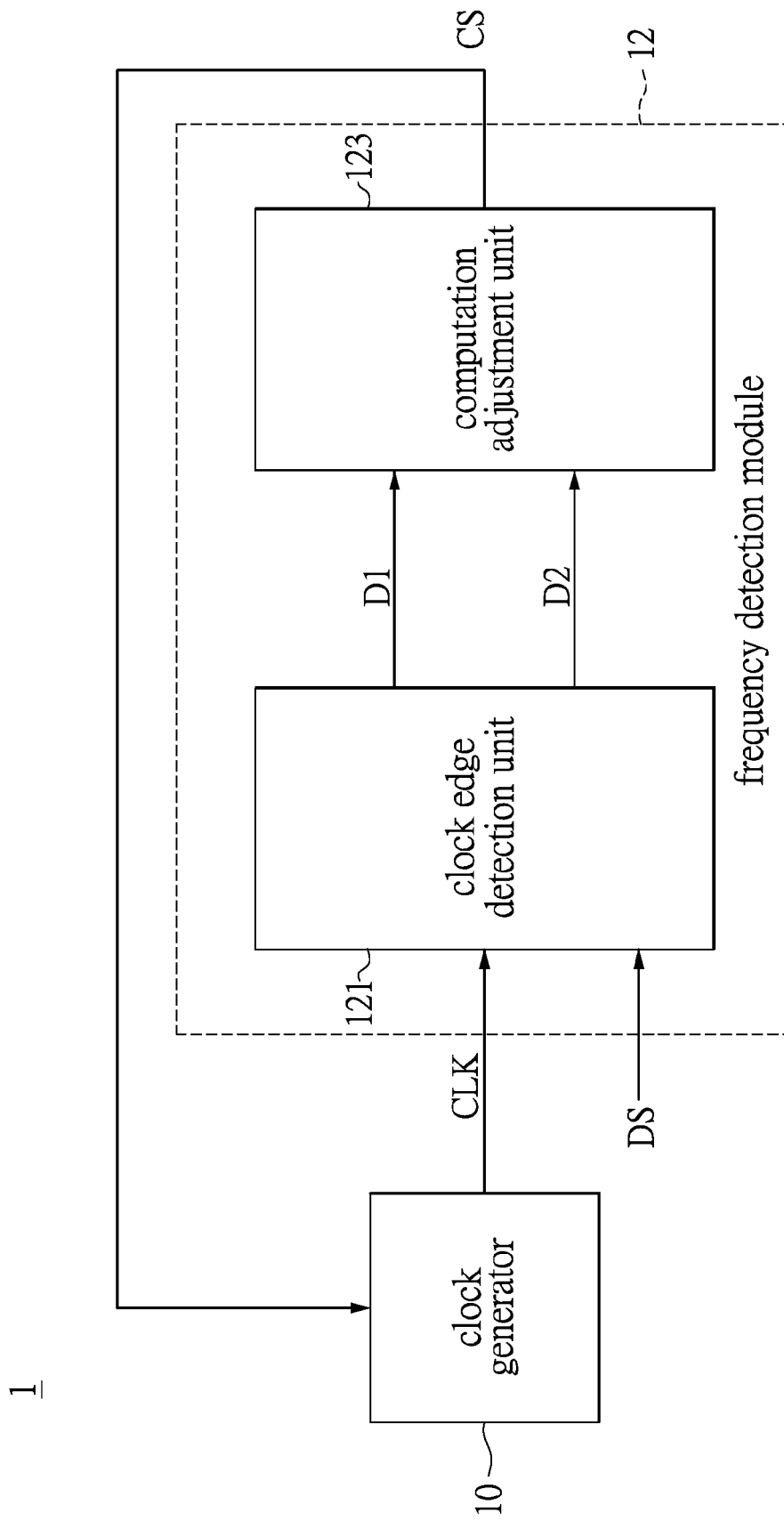
FIG. 3 is a block diagram of a frequency detection module for a clock and data recovery circuit provided in accordance with an exemplary embodiment of the present disclosure.

In order to further elaborate on the operation of the frequency detection module 12, the present disclosure further provides an implementation of the frequency detection module 12. However the present disclosure is not limited thereto. Please refer to FIG. 3, which shows a block diagram illustrating a frequency detection module for a clock and data recovery circuit provided in accordance with an exemplary embodiment of the present disclosure. The frequency detection module 12 may be incorporated into the CDR circuit 1, and thus please refer to FIG. 3 in conjunction with FIG. 1. Detailed descriptions for components in FIG. 3 that are similar to those described in FIG. 1 will be omitted. Moreover, for ease of reference, the same or similar parts or features will be given with the same or similar reference number.

The frequency detection module 12 includes a clock edge detection unit 121 and a computation adjustment unit 123. The clock edge detection unit 121 respectively receives the clock signal CLK from the clock generator 10 and the data signal DS from the transmitting end. Additionally, the clock edge detection unit 121 is further configured to detect clock edges for the clock signal CLK and the data signal DS and generate a first detection value D1 and a second detection value D2, respectively. Particularly, the first detection value D1 represents the total number of rising edges and falling edges detected for the clock signal CLK. The second detection value D2 represents the total number of rising edges and falling edges detected for the data signal DS.

The computation adjustment unit 123 is configured to compute a first ratio C1 between the first detection value D1 and the second detection value D2, and to correspondingly generate the control signal CS to the clock generator 10 by comparing the first ratio C1 and the transition density TD, so as to correspondingly increase or decrease the frequency of the clock signal CLK generated by the clock generator 10.

The core idea of the frequency detection module 12 is to deduce the clock signal CLK complying with the characteristic of the transmission density TD. The first ratio C1 (i.e., D2/D1) computed by the computation adjustment unit 123 should be the same as the known transition density TD. Accordingly, when the first ratio C1 and the transition density TD are both 0.6, the CDR circuit 1 can ensure that the frequency difference between the clock signal CLK and the data signal DS is less than 1%. The CDR circuit 1 therefore can operate normally with the clock signal CLK.

On the other hand, when the first ratio C1 is different from the transition density, the CDR circuit 1 cannot sample the data signal DS using the clock signal CLK to. The computation adjustment unit 123 generates and outputs the control signal CS to the clock generator 10 to correspondingly increase or decrease the frequency of the clock signal CLK. As a result, the first detection value D1 associated with the clock signal CLK after being adjusted by the control signal CS. When the computation adjustment unit 123 re-calculates the first ratio C1 between the first detection value D1 adjusted and the second detection value D2 to be 0.6, same as the transition density TD, the CDR circuit 1 can then ensure that the frequency difference between the clock signal CLK and the data signal DS is less than 1%. The CDR circuit 1 thus can operate normally with the clock signal CLK adjusted.

Based on the above elaboration, those skilled in the art should be able to generalize various implementations for the frequency detection module 12 to generate the control signal. In one embodiment, when the first ratio C1 is greater the transition density TD, the frequency detection module 12 generates a corresponding control signal CS to increase the frequency of the clock signal CLK generated by the clock generator 10. In other words, when the first ratio C1 at the beginning is greater than the transition density TD, the clock generator 10 being controlled by the control signal CS will cause the first detection value D1 to increase, lowering the first ratio C1 to be the same as the transition density TD.

Additionally, when the first ratio is less than the transition density TD, the frequency detection module 12 generates the control signal CS to correspondingly lower the frequency of the clock signal CLK generated by the clock generator 10. In other words, when the first ratio C1 at the beginning is less than the transition density TD, the clock generator 10 being controlled by the control signal CS will cause the first detection value D1 to decrease, increasing the first ratio C1 to be the same as the transition density TD.

It can be noted from the above elaboration, the CDR circuit 1 is operable to cause the clock generator 10 to continuously adjust the frequency the clock signal CLK using the frequency detection module 12, so as to correspondingly adjust the number of the clock edges (i.e., the first detection value D1) to comply with the characteristic of the transition density TD. Accordingly, when the frequency of the clock signal CLK generated by the clock generator 10 is stabilized and the same as the frequency of the data signal DS, the CDR circuit 1 can begin to operate normally using the clock signal CLK.

Moreover, those skilled in the art, based on the above elaboration, should be able to understand that the clock generator 10 of the CDR circuit 1 is operable to compute the frequency of the clock signal CLK to be generated according to the known transition density TD, instead of having to continuously cause the clock generator 10 to adjust the frequency of the clock signal CLK (i.e., increases/decreases the frequency of the clock signal CLK), in order to comply with the characteristic of the transition density TD. Most of the conventional clock generators adjust the frequency of the clock signal CLK by multiples. The CDR circuit 1 on the other hand is operable to directly control the clock generator 10 to generate the clock signal CLK having the desired frequency though computation, and therefore can effectively eliminate or reduce the amount of time required continuously adjusting the clock signal CLK.

Figure 4:
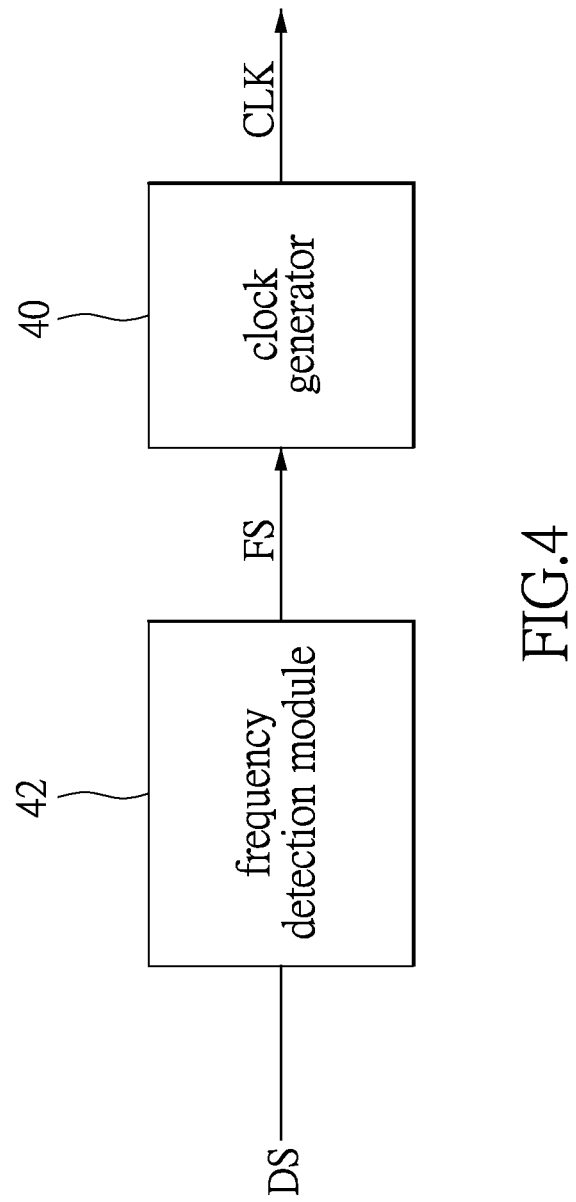
FIG. 4 is a block diagram of a clock and data recovery circuit provided in accordance with another exemplary embodiment of the present disclosure.

Please refer to FIG. 4, which shows a block diagram illustrating a clock and data recovery circuit provided in accordance with another exemplary embodiment of the present disclosure. In comparison to the CDR circuit 1 of FIG. 1, the difference between the CDR circuit 4 of FIG. 4 and the CDR circuit 1 of FIG. 1 is that a built-in clock generator 40 of the CDR circuit 4 does not need to continuously adjust the frequency of the clock signal CLK. Briefly, although the clock signal CLK of the clock generator 40 has a preset initial frequency, the preset initial frequency of the clock signal CLK may not necessarily be the same as the frequency of the data signal DS. However, the clock generator 40 can directly generate the clock signal CLK desired according to the frequency computation value FS outputted by the frequency detection module 42 in such a manner that the frequency of the clock signal CLK generated by the frequency detection module 42 when stabilized matches the frequency of the data signal DS. For ease of reference, the same or similar parts or features in FIG. 1 and FIG. 4 will be given with the same or similar reference number.

More specifically, the CDR circuit 4 includes the clock generator 40 and the frequency detection module 42. The frequency detection module 42 is coupled to the clock generator 40. The above described components can be integrated or separately disposed, and the instant disclosure is not limited thereto.

The frequency detection module 42 is configured to generate the frequency computation value FS according to the data signal DS received and the transition density TD. The clock generator 40 is configured to generate the clock signal CLK according to the frequency computation value FS received. Similarly, the transition density TD of the instant embodiment also represents the ratio between the total number of clock edges of the data signal DS and the clock edges of the standard clock signal within a unit time interval T.

Figure 5:
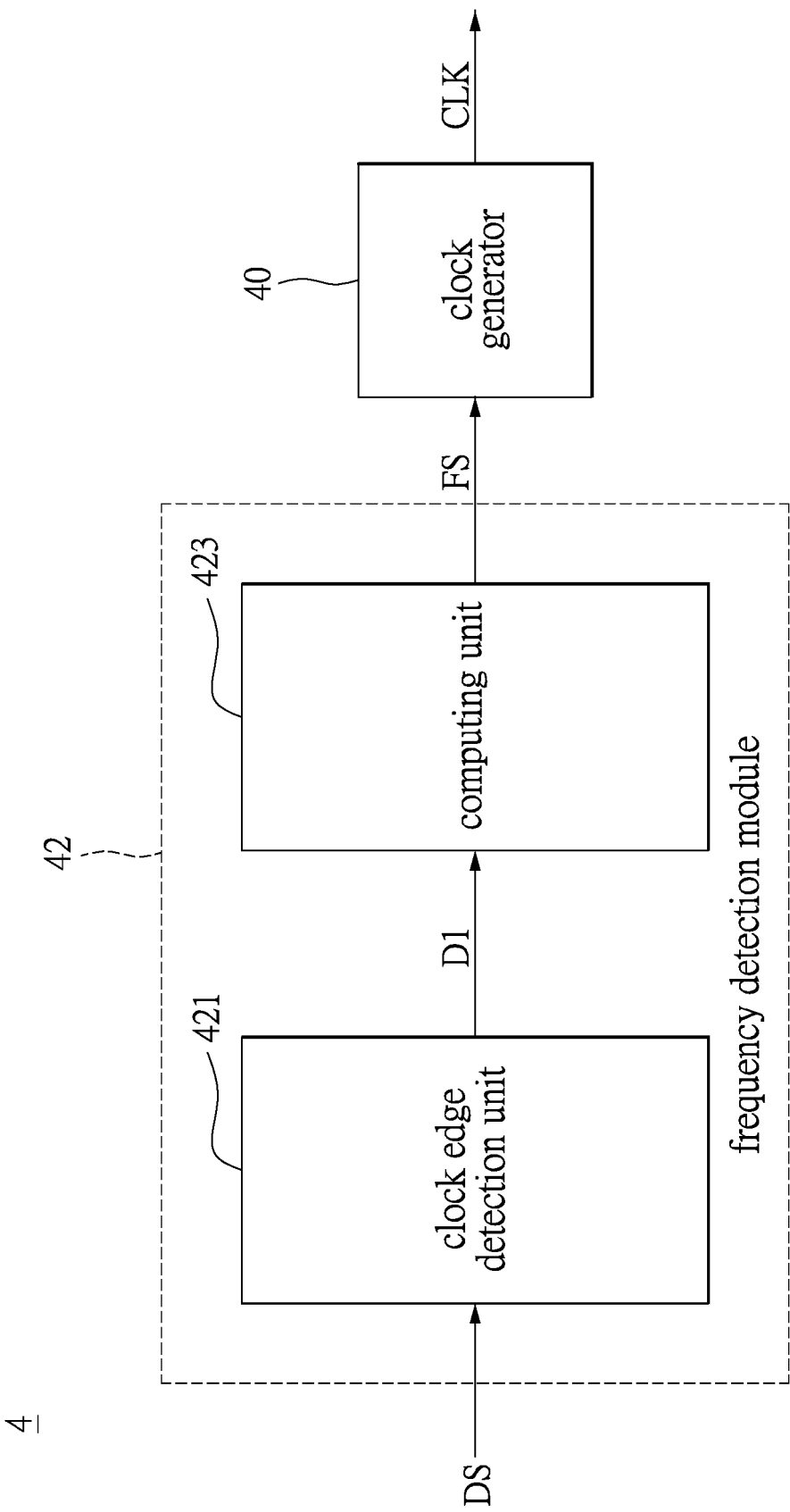
FIG. 5 is a block diagram illustrating a frequency detection module of a clock and data recovery circuit provided in accordance with another exemplary embodiment of the present disclosure.

In order to further elaborate on the operation of the frequency detection module 42, the present disclosure further provides an implementation for the frequency detection module 42. However, the present disclosure is not limited thereto. Please refer to FIG. 5, which shows a block diagram illustrating a frequency detection module of a clock and data recovery circuit provided in accordance with another exemplary embodiment of the present disclosure. However the present disclosure is not limited thereto. The frequency detection module 12 may be incorporated into the CDR circuit 1, and thus please refer to FIG. 3 in conjunction with FIG. 1. Components in FIG. 5 that are similar to those described in FIG. 1 and FIG. 4 will be omitted. Moreover, for ease of reference, the same or similar parts or features will be given with the same or similar reference number.

The frequency detection module 42 includes a clock edge detection 421 and a computing unit 423. It can be clearly noted that the clock edge detection unit 421 is configured to receive a data signal DS and generate a first detection value D1 based on the number of clock edges detected for the data signal DS.

The computing unit 423 is configured to compute the frequency computation value FS and the transition density TD. The computing unit 423 further outputs the frequency computation value FS to the clock generator 40.

Figure 6:
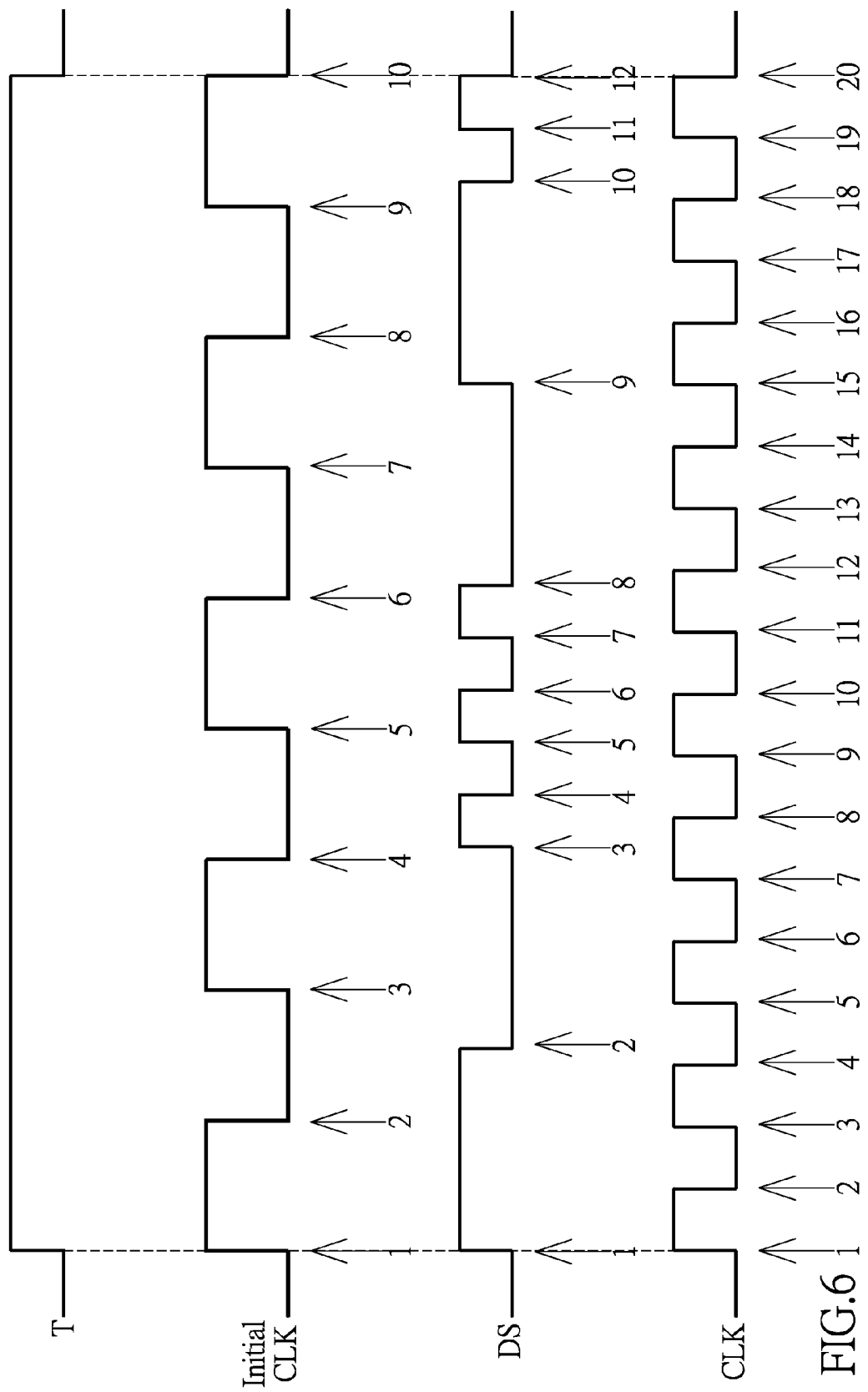
FIG. 6 is a timing diagram describing the operation of a clock and data recovery circuit provided in accordance with an exemplary embodiment of the present disclosure.

Similar to the previous embodiment, the following embodiments also will be described by using the 8B10B encoding scheme in accordance with the DisplayPort technology, i.e., the transition density TD for the following embodiments is 0.6. FIG. 6 shows a timing diagram describing the operation of a clock and data recovery circuit provided in accordance with an exemplary embodiment of the present disclosure. Supposing the clock generator 40 initially generates a clock signal CLK having 10 clock edges detected in a unit time interval T while the clock edges detected for a data signal DS is 12, then the first detection value D1 is 12.

Next, since the CDR circuit 4 knows that the transition density TD of the data signal DS is 0.6, the computing unit 423 then calculates the frequency computation value FS to be 20 (i.e., 12/0.6) according to the first detection value D1 and the transition density TD. In other words, the frequency computation value FS calculated by the computing unit 423 has to equal the total number of clock edges of the clock signal CLK generated by the clock generator 40 during the unit time interval T.

It can be noted from above that the CDR circuit 4 cannot sample the data signal DS with the clock signal CLK (e.g., the clock signal CLK having 10 clock edges) initially generated by the clock generator 40. The clock generator 40 must adjust the frequency (e.g., adjust the clock edges to 20) of the clock signal CLK generated according to the frequency computation value FS and sample the data signal DS with the adjusted clock signal CLK. In practice, the number of clock edges associated with the clock signal CLK generated by the clock generator 40 can be stabilized to be the same as the frequency of the data signal DS by having the number of clock edges associated with the clock signal CLK generated by the clock generator 40 equal to the frequency computation value FS. However, it should be understood that the above embodiment is merely provided as an exemplary implementation, and the present disclosure is not limited thereto.

Accordingly, the CDR circuit 4 of the instant embodiment can find or obtain the ideal frequency for the clock signal CLK using the computation method described, and drive the clock generator 40 to directly generate the clock signal CLK with ideal frequency. By this methodology, the CDR circuit 4 can attain the characteristic of the transition density TD without constantly adjusting the frequency of the clock signal CLK (i.e., constantly increase and decrease the frequency of the clock signal CLK). As a result, the time needed for adjusting the frequency of the clock signal CLK can be reduced or eliminated.

In summary the CDR circuit 4 of the instant embodiment is capable of accurately detecting the clock frequency of the data signal received and directly adjusting the clock signal generated by the built-in clock generator without the need of referencing an external-supplied reference clock signal to adjust the clock signal generated by the built-in clock generator. Accordingly, the cost for design of the overall system architecture can be lowered, and the CDR circuit can also operate normally.

The concept of the present disclosure may be further extended to the calibration of the internal frequency source in a chip. As described previously, the internal frequency source of a chip generally is easily affected by factors including but not limited to the semiconductor processing variations, temperature variations, and voltage variations, which generates frequency drifting problems. On the other hand, the CDR circuit 4 of the instant embodiment has knowledge of the transition density, wherein the transition density is close to a constant value, i.e., the number of clock edges of the data signal in a period of time will also be close to a constant value. Those skilled in the art should be able to utilize the transition density mechanism and calibrate the internal frequency source of a chip, accordingly.

In order to further elaborate on the operation of the CDR circuit, the present disclosure further provides an implementation method for frequency detection. Please refer to FIG. 7, which shows a flowchart diagram illustrating a frequency detection method provided in accordance with an exemplary embodiment of the present disclosure. The method depicted in FIG. 7 may be implemented with the CDR circuit 1 depicted in FIG. 1 and FIG. 3. Detailed description for the steps provided herein is similar to that described in the previous embodiment, and thus further description will be omitted.

In Step S701, a clock generator is driven to generate a clock signal. In Step S703, the frequency detection module is then driven to generate and output a control signal to the clock generator according to a transition density and a data signal received to correspondingly increase or decrease the frequency of the clock signal. The clock generator increases or decreases the frequency of the clock signal generated responsive to the control signal received.

An exemplary implementation associated with Step 703 will be provided next to illustrate the generation method of the control signal, but the present disclosure should not be limited thereto. Please refer to FIG. 8, which shows a flowchart diagram illustrating a method for generating a control signal provided in accordance with an exemplary embodiment of the present disclosure. Detailed description for the steps described in FIG. 8 that are similar to those described in FIG. 7 will be omitted.

Figure 7:
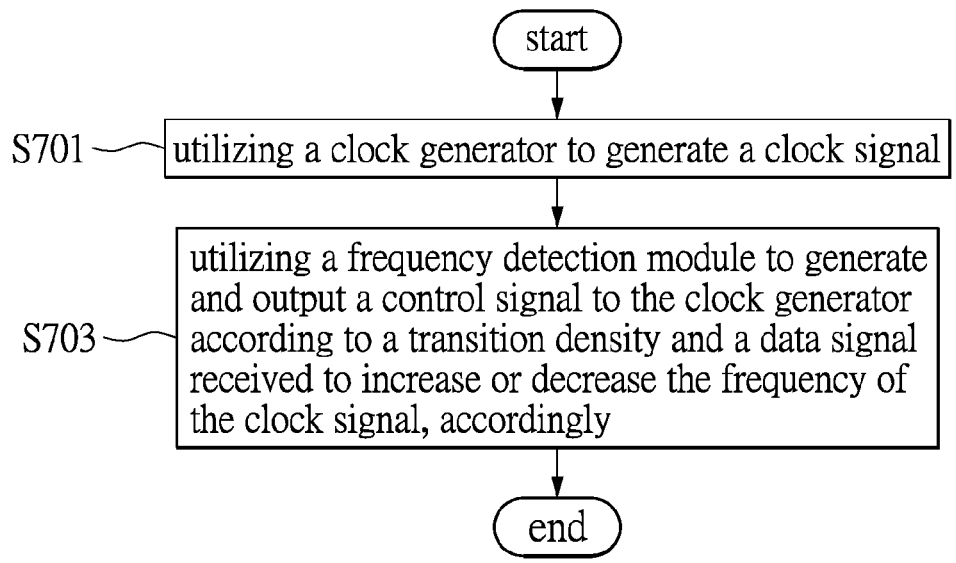
FIG. 7 is a flowchart diagram of a frequency detection method provided in accordance with an exemplary embodiment of the present disclosure.
Figure 8:
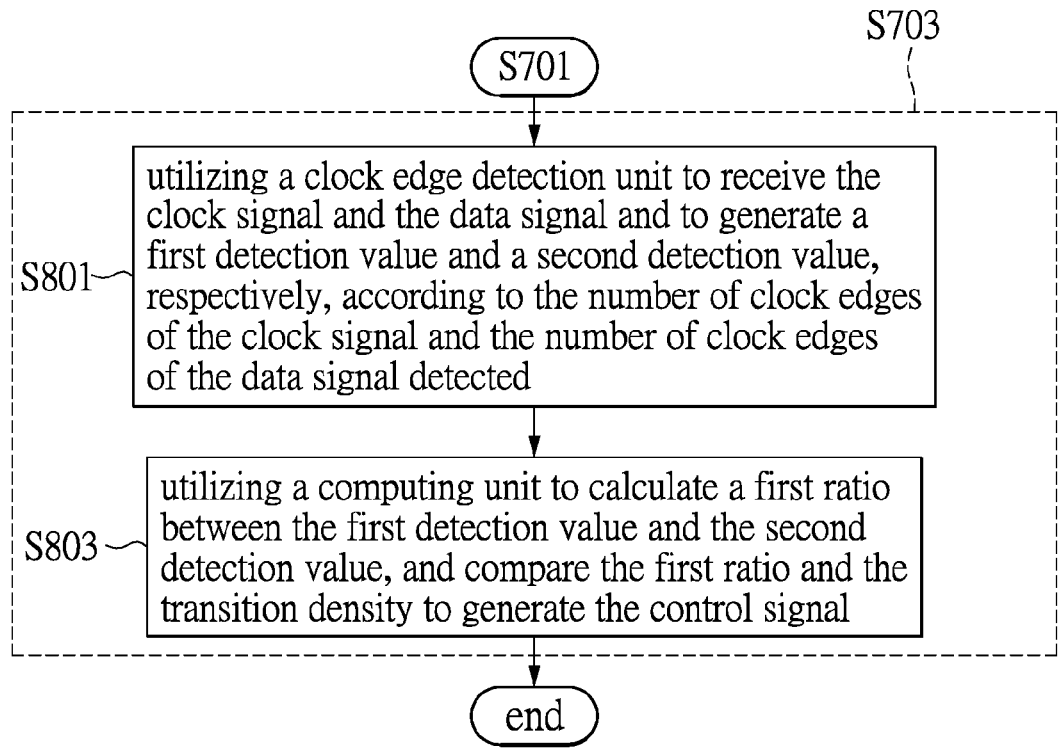
FIG. 8 is a flowchart diagram illustrating a method for generating a control signal provided in accordance with an exemplary embodiment of the present disclosure.

Please refer to FIG. 7 in conjunction with FIG. 8, wherein Step S703 includes Step S801 includes Step S801~S803. In Step S801, a clock edge detection unit is driven to receive the clock signal, respectively and the data signal, and to generate a first detection value and a second detection value according to the total number of clock edges detected. In Step S803, a computing unit is then driven to calculate the first ratio between the first detection value and the second election, and generate a corresponding control signal by comparing the first ratio and the transition density.

Figure 9:
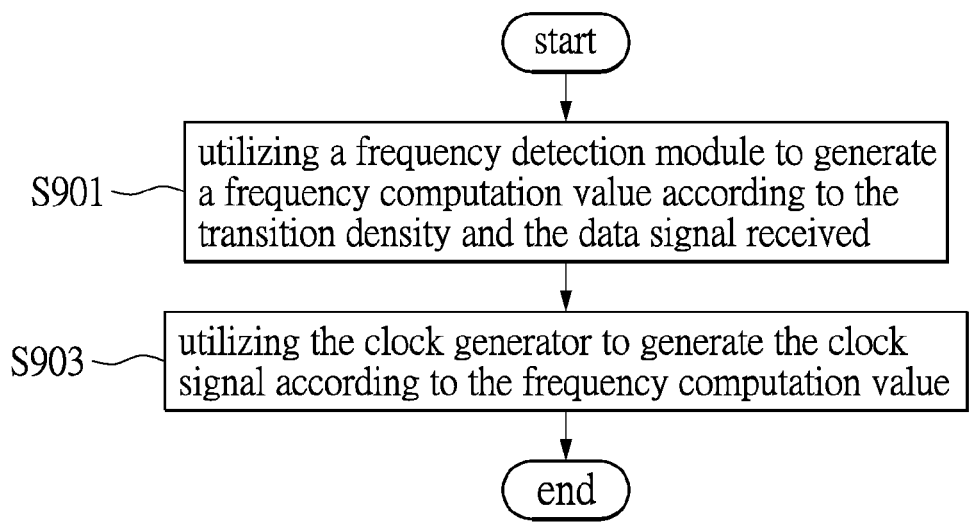
FIG. 9 is a flowchart diagram of a frequency detection method provided in accordance with another exemplary embodiment of the present disclosure.

Please refer to FIG. 9, which shows a flowchart diagram of a frequency detection method provided in accordance with another exemplary embodiment of the present disclosure. FIG. 9 can be implemented and executed by the CDR circuit described in FIG. 4 and FIG. 5. Please refer to FIG. 9 in conjunction with FIG. 4 and FIG. 5. Details of the steps have been thoroughly described in previous embodiments, and thus only the relevant information will be described. In comparison to the frequency detection method of FIG. 7, the frequency detection method depicted FIG. 9 obtains a desired frequency using the computation algorithm described and drives the clock generator to generate a clock signal with the desired frequency, thereby effectively reducing or eliminating the time spent for adjusting the clock signal, In Step S901, the frequency detection module is driven to generate a frequency computation value associated with the clock signal according to the transition value. In Step S903, a clock generator is driven to generate the clock signal according to the frequency computation value received, wherein the frequency of the clock signal generated is the same as the frequency of the data signal.

Figure 10:
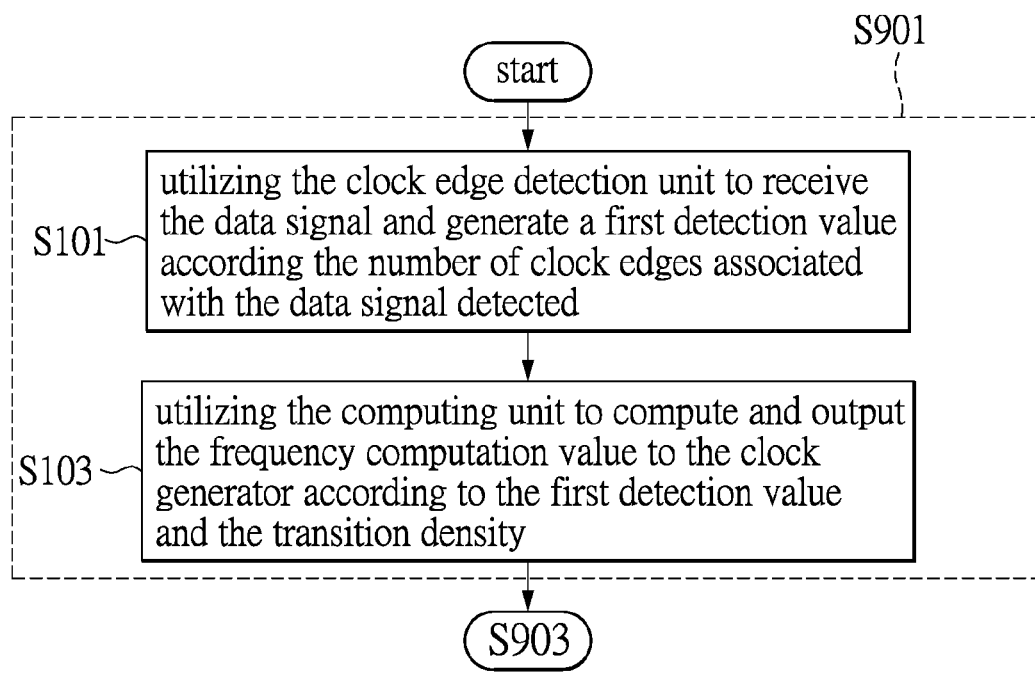
FIG. 10 is a flowchart diagram of a method for generating a frequency computation method provided in accordance with an exemplary embodiment of the present disclosure.

In order to further elaborate the technique for generating the frequency computation value described in Step S901, a more detailed embodiment will be presented for illustration purposes but the present disclosure is not limited thereto. Please refer to FIG. 10, which shows a flowchart diagram of a method for generating a frequency computation method provided in accordance with an exemplary embodiment of the present disclosure. Steps shown in FIG. 10 that are similar to those described in FIG. 9 will be omitted. Moreover, for ease of reference, the same or similar features will be given with the same or similar reference number.

In Step S101, a clock edge detection unit is driven to receive a data signal and generate a first detection value according to the number of clock edges of the data signal. In Step S103, a computing unit is utilized to calculate the frequency of the data signal according to the transition density and the first detection value. The computing unit is driven to output the frequency computation value to the clock generator.

In summary, the CDR circuit and the frequency detection method provided by the present disclosure is capable of accurately detecting the clock frequency of the data signal received and directly adjusting the clock signal generated by the built-in clock generator without having to reference an externally-supplied reference clock signal to adjust the clock signal generated by the built-in clock generator. Accordingly, the cost for designing the overall system architecture can be effectively lowered and the CDR circuit can function normally.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A crystal-less clock and data recovery circuit without using an external reference clock signal, comprising:
   a clock generator, operable to generate a clock signal; and
   a frequency detection circuit, coupled to the clock generator and configured to generate and output a control signal to the clock generator according to a transition density and a data signal received;
   wherein the clock generator correspondingly increases or decreases the frequency of the clock signal generated according to the control signal received;
   wherein the transition density is the ratio between the number of clock edges detected associated with the data signal and the number of clock edges associated with a standard clock signal detected within a unit time interval, wherein the number of clock edges associated with the data signal comprises the number of rising edges and the number of falling edges, and the number of clock edges associated with the standard clock signal comprises the number of rising edges and the number of falling edges.

2. The crystal-less clock and data recovery circuit according to claim 1, wherein the frequency detection circuit comprises:
   a clock edge detection circuit, configured to receive the clock signal and the data signal and generate a first detection value responsive to the number of clock edges detected for the clock signal and a second detection value responsive to the number of the edge detected for the data signal; and
   a computation adjustment circuit, configured to compute a first ratio between the first detection value and the second detection value, and comparing the first ratio and the transition density to generate the control signal.

3. The crystal-less clock and data recovery circuit according to claim 2, wherein the control signal generated by the frequency detection circuit drives the clock generator to increase the frequency of the clock signal generated when the first ratio is computed to be greater than the transition density.

4. The crystal-less clock and data recovery circuit according to claim 2, wherein the control signal generated by the frequency detection circuit drives the clock generator to decrease the frequency of the clock signal generated when the first ratio is computed to be less than the transition density.

5. The crystal-less clock and data recovery circuit according to claim 1, wherein the clock generator does not receive the external reference clock signal.

6. A crystal-less clock and data recovery circuit without using an external reference clock signal, comprising:
   a frequency detection circuit, configured to generate a frequency computation value according to a transition density and a data signal received; and
   a clock generator, coupled to the frequency detection circuit and configured to generate a clock signal according to the frequency computation value, wherein the frequency of the clock signal is the same as the frequency of the data signal;
   wherein the transition density is the ratio between the number of clock edges associated with the data signal and the number of clock edges associated with a standard clock signal within a unit time interval, wherein the number of clock edges associated with the data signal comprises the number of rising edges and the number of falling edges, and the number of edges of the standard clock signal comprises the number of rising edges and the number of falling edges.

7. The crystal-less clock and data recovery circuit according to claim 6, wherein the frequency detection circuit comprises:
   a clock edge detection circuit, configured to receive the data signal and generate a first detection value responsive to the number of clock edges detected for the data signal; and
   a computing circuit, configured to compute the frequency computation value according to the first detection value and the transition density, and outputting the frequency computation value to the clock generator.

8. The crystal-less clock and data recovery circuit according to claim 7, wherein the frequency computation value computed by the frequency detection circuit is equal to the number of edges detected for the clock signal that is generated by the clock generator during the unit time interval.

9. The crystal-less clock and data recovery circuit according to claim 6, wherein the clock generator does not receive the external reference clock signal.

10. A frequency detection method for a crystal-less clock and data recovery circuit, wherein the crystal-less clock and data recovery circuit comprises a clock generator and a frequency detection circuit, the frequency detection method comprising:
    utilizing the clock generator to generate a clock signal; and
    utilizing the frequency detection circuit to generate and output a control signal to the clock generator according to a transition density and a data signal received;
    wherein the clock generator correspondingly increases or decreases the frequency of the clock signal generated responsive to the control signal received;
    wherein the transition density is the ratio between the number of edges detected associated with the data signal and the number of clock edges associated with a standard clock signal detected within a unit time interval, wherein the number of clock edges detected for the data signal comprises the number of rising edges and the number of falling edges, and the number of clock edges of the standard clock signal comprises the number of rising edges and the number of falling edges detected.

11. The frequency detection method according to claim 10, wherein the frequency detection circuit comprises a clock edge detection circuit and a computation adjustment circuit, the frequency detection method comprising:
    utilizing the clock edge detection circuit to generate a first detection value responsive to the number of clock edges detected for the clock signal received and a second detection value responsive to the number of the clock edges detected for the data signal received; and
    utilizing the computation adjustment circuit to compute a first ratio between the first detection value and the second detection value and comparing the first ratio and the transition density to generate the control signal.

12. The frequency detection method according to claim 11, wherein the control signal generated by the frequency detection circuit causes the clock generator to increase the frequency of the clock signal generated when the first ratio is computed to be greater than the transition density.

13. The frequency detection method according to claim 11, wherein the control signal generated by the frequency detection circuit causes the clock generator to decrease the frequency of the clock signal generated when the first ratio is computed to be less than the transition density.

14. The frequency detection method according to claim 10, wherein the clock generator does not receive an external reference clock signal.

* * * * *